(12) United States Patent
Haupt

(10) Patent No.: US 6,443,525 B1
(45) Date of Patent: Sep. 3, 2002

(54) VEHICLE SEAT ASSEMBLY AND FASTENING DEVICE

(75) Inventor: Gregory A. Haupt, Brighton, MI (US)

(73) Assignee: Johnson Controls Technology Company, Plymouth, MI (US)

( * ) Notice: Subject to any disclaimer, the term of this patent is extended or adjusted under 35 U.S.C. 154(b) by 0 days.

(21) Appl. No.: 09/576,642

(22) Filed: May 22, 2000

(51) Int. Cl.⁷ .................................................. A47C 7/02
(52) U.S. Cl. .............................. 297/452.6; 297/452.59; 297/DIG. 6
(58) Field of Search .......................... 297/452.6, 452.59, 297/DIG. 6, 218.1, 218.2

(56) References Cited

U.S. PATENT DOCUMENTS

| | | |
|---|---|---|
| 3,566,423 A | 3/1971 | Reinfeldt |
| 3,654,059 A | 4/1972 | Zisblatt |
| 3,695,690 A | 10/1972 | Carson |
| 4,776,636 A | 10/1988 | Pyle et al. |
| 4,798,416 A | 1/1989 | Faust et al. |
| 5,235,826 A | 8/1993 | Brooks et al. |
| 5,375,552 A | 12/1994 | Scott |
| 5,478,134 A | 12/1995 | Bernard et al. |
| 5,516,575 A | 5/1996 | Appelt |
| 5,605,373 A | 2/1997 | Wildern, IV et al. |
| 5,882,073 A | 3/1999 | Burchi et al. |

*Primary Examiner*—Daniel P. Stodola
*Assistant Examiner*—Hugh B. Thompson
(74) *Attorney, Agent, or Firm*—Foley & Lardner

(57) ABSTRACT

A vehicle seat assembly having a trim cover, a foam pad, and a fastening device, which includes a supporting member and a fastening member. The supporting member has an elongated shape and is contourable and bendable along a surface of the foam pad. The fastening member includes a first section fastened to said foam pad and a second section having a first surface engaged with a corresponding fastening member and a second surface opposite the first surface fastened to the supporting member.

30 Claims, 6 Drawing Sheets

VEHICLE SEAT ASSEMBLY AND FASTENING DEVICE

TECHNICAL FIELD OF THE INVENTION

This invention generally relates to fastening devices to fasten trim covers to foam pads of vehicle seat assemblies. More specifically, this invention relates to fastening devices that allow contouring and bending along a surface of the foam pad.

BACKGROUND

Conventional vehicle seat assemblies include a trim cover, which functions to provide a comfortable seating surface for an occupant, and a foam pad, which functions to provide a cushion support for the occupant. Some of the conventional vehicle seat assemblies also include hook-and-loop fasteners provided in a rectangular pattern along the surface of the foam pad to fasten the trim cover to the foam pad. While the conventional hook-and-loop materials contour along the surface of the foam pad, they do not bend along the surface of the foam pad. In other words, the conventional hook-andloop materials extend within a first dimension (the 'x' dimension) and contour within a second dimension (the 'z' dimension), but do not bend into a third dimension (the 'y' dimension).

Because the hook and loop fasteners do not bend along the surface of the foam pad, the hook and loop fasteners must be provided in many small strips and must be individually placed along the surface of the foam pad to form the rectangular pattern. The cost of numbering, storing, and assembling each individual hook and loop fastener is a significant cost.

SUMMARY OF THE INVENTION

Accordingly, this invention provides for a vehicle seat assembly and fastening device that overcomes the problems and disadvantages of the conventional techniques in the art. The invention also provides for a fastening device that contours and bends along the surface of the foam pad, thereby replacing the individual hook and loop fasteners of the current techniques in the art and reducing the number of parts needed to fasten the trim cover to the foam pad. The invention also provides for a method for providing the vehicle seat assembly and the fastening device.

Briefly, the invention includes a vehicle seat assembly having a trim cover, a foam pad, and a fastening device, which includes a supporting member contourable and bendable along a surface of the foam pad. The fastening member includes a first section fastened to said foam pad and a second section having a first surface engaged with a corresponding fastening member and a second surface opposite the first surface fastened to the supporting member.

BRIEF DESCRIPTION OF THE DRAWINGS

Further features and advantages of the invention will become apparent from the following discussion and accompanying drawings, in which.

DETAILED DESCRIPTION OF THE PREFERRED EMBODIMENT

The following description of the preferred embodiment is merely exemplary in nature, and is in no way intended to limit the invention or its application or uses. While the invention is discussed in reference to a vehicle seat assembly, the fastening device of the invention may be used to fasten other devices, such as a trim cover to a vehicle panel.

Figure 1:
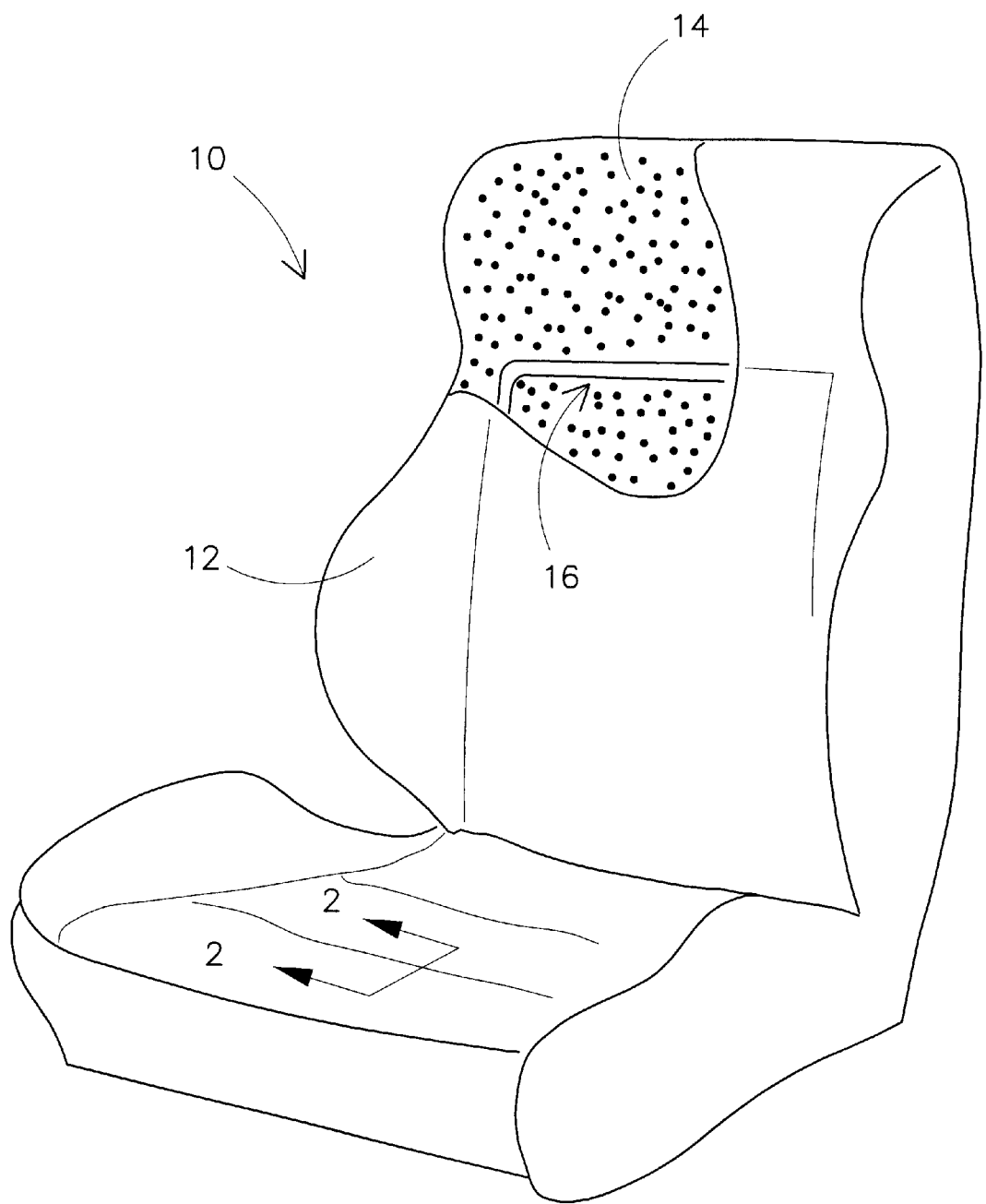
FIG. 1 is a perspective view of the vehicle seat assembly of a preferred embodiment of the invention.

As shown in FIG. 1, the vehicle seat assembly 10 of the invention includes a trim cover 12, a foam pad 14, and a fastening device 16. The vehicle seat assembly 10 is preferably provided as a bucket-type vehicle seat assembly. The vehicle seat assembly 10, however, may alternatively be provided as a bench-type vehicle seat assembly or as any other suitable type vehicle seat assembly. The trim cover 12, which functions to provide a comfortable seating surface for an occupant, and the foam pad 14, which functions to provide a cushion support for the occupant, are preferably made from conventional materials and with conventional methods, but may alternatively be made from other suitable materials and with other suitable methods. The fastening device 16 functions to fasten the trim cover 12 to the foam pad 14.

Figure 2:
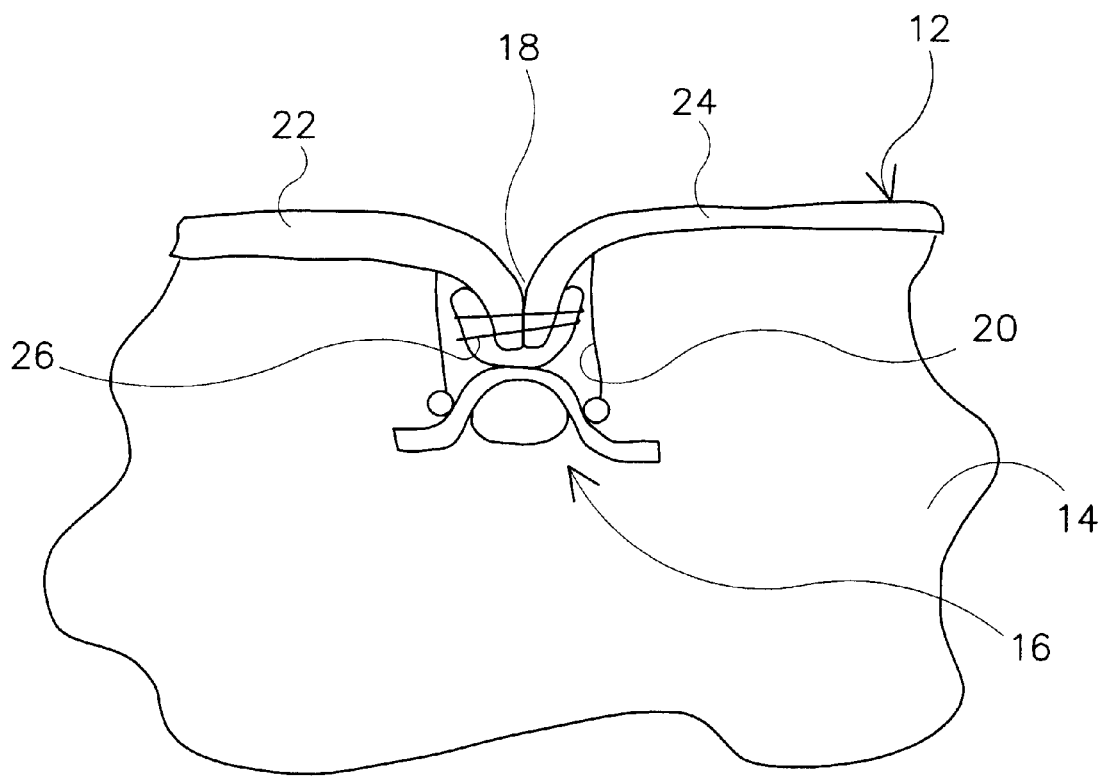
FIG. 2 is a partial cross-sectional view of the fastening device of the preferred embodiment of the invention, taken along the line 2—2 of FIG. 1.

As shown in FIG. 2, the fastening device 16 of the invention is preferably located beneath a seam 18 of the trim cover 12 and within a trench 20 of the foam pad 14. The connection of a first portion 22 of the trim cover 12 to a second portion 24 of the trim cover 12 at the seam 18 functions to improve the aesthetic quality of the vehicle seat assembly. The first portion 22 and the second portion 24 may be connected by a sewn thread 26 or by any other suitable device and method. The trench 20 in the foam pad 14 functions to contain the salvage of the trim cover 12 and to reduce the negative impact of the seam 18 on the comfort of the vehicle seat assembly. The fastening device 16 may alternatively be located in any other suitable location on the surface of the foam pad 14 or within the foam pad 14 to fasten the trim cover 12 to the foam pad 14.

Figure 3:
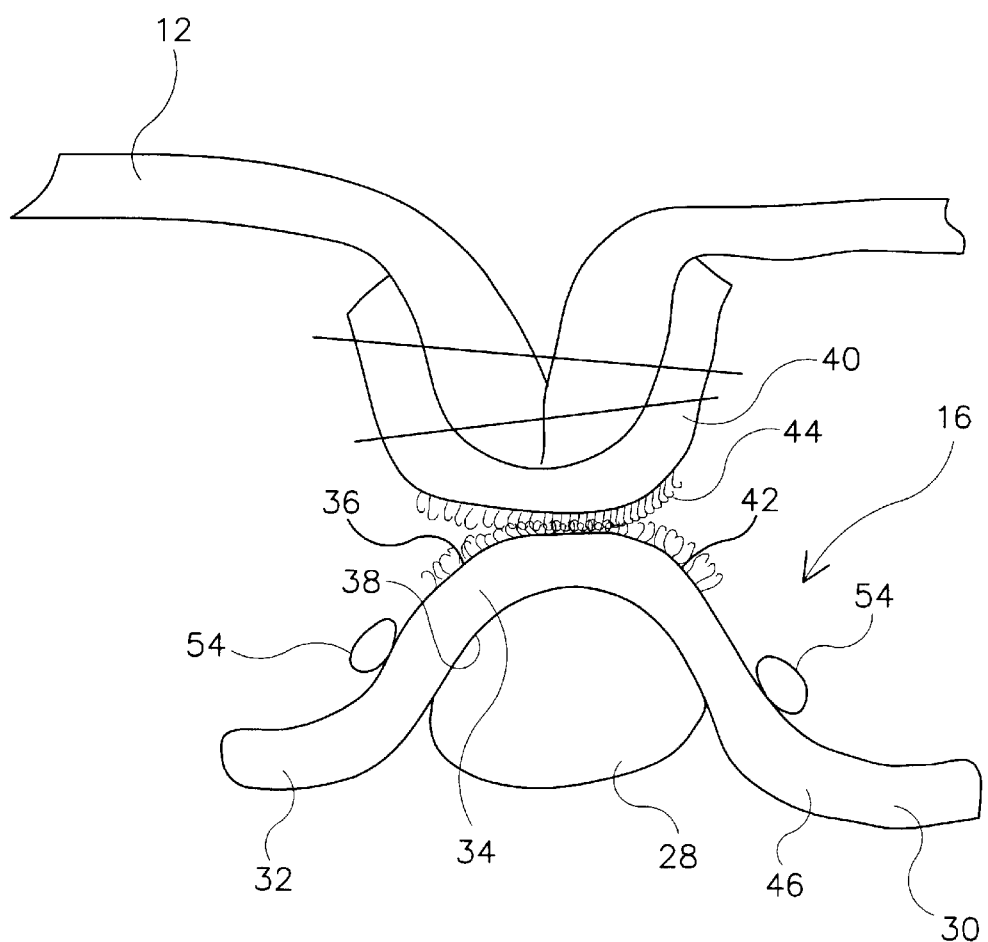
FIG. 3 is an enlarged view of the fastening device of FIG. 2.

As shown in FIG. 3, the fastening device 16 of the invention includes a supporting member 28 and a fastening member 30. The supporting member 28, which functions to support the fastening member 30, preferably has an elongated shape and preferably has a circular cross-section. The supporting member 28 may alternatively have an elliptical, triangular, or other suitable cross-section. The supporting member 28 is preferably contourable and bendable. Consequently, the supporting member 28 is preferably made from a flexible material, such as a foam material, and with conventional methods. The supporting member 28 may alternatively be made from other suitable materials and with other suitable methods.

The fastening member 30 of the invention includes a first section 32 and a second section 34. The first section 32, which functions to fasten the trim cover 12 to the foam pad, is preferably fastened to the foam pad by foaming the foam pad against the first section 32. The first section 32 may be alternatively fastened to the foam pad with other suitable devices and methods. The second section 34 has a first surface 36 and a second surface 38. The first surface 36 is engageable with a corresponding fastening member 40 coupled to the trim cover 12. The engagement is preferably accomplished by providing a hook-and-loop material, or other suitable device, with a first layer 42 fastened to the first surface 36 and a second layer 44 fastened to the corresponding fastening member 40. The engagement may alternatively be provided with other suitable devices and methods. The second surface 38, which is preferably provided opposite the first surface 36, is preferably fastened to the supporting member 28 by foaming the supporting member 28 against the second surface 38. The second surface 38 may alternatively be fastened to the supporting member 28 with other suitable devices and methods.

The fastening member 30 of the preferred embodiment of the invention, also includes a third section 46 preferably fastened to the foam pad in a manner similar to the first section 32. Like the first section 32, the third section 46 functions to fasten the trim cover 12 to the foam pad. The second section 34 is located between the first section 32 and the third section 46, and the first section 32 and the third section 46 preferably extend away from the supporting member 28 in opposite directions.

Figure 4:
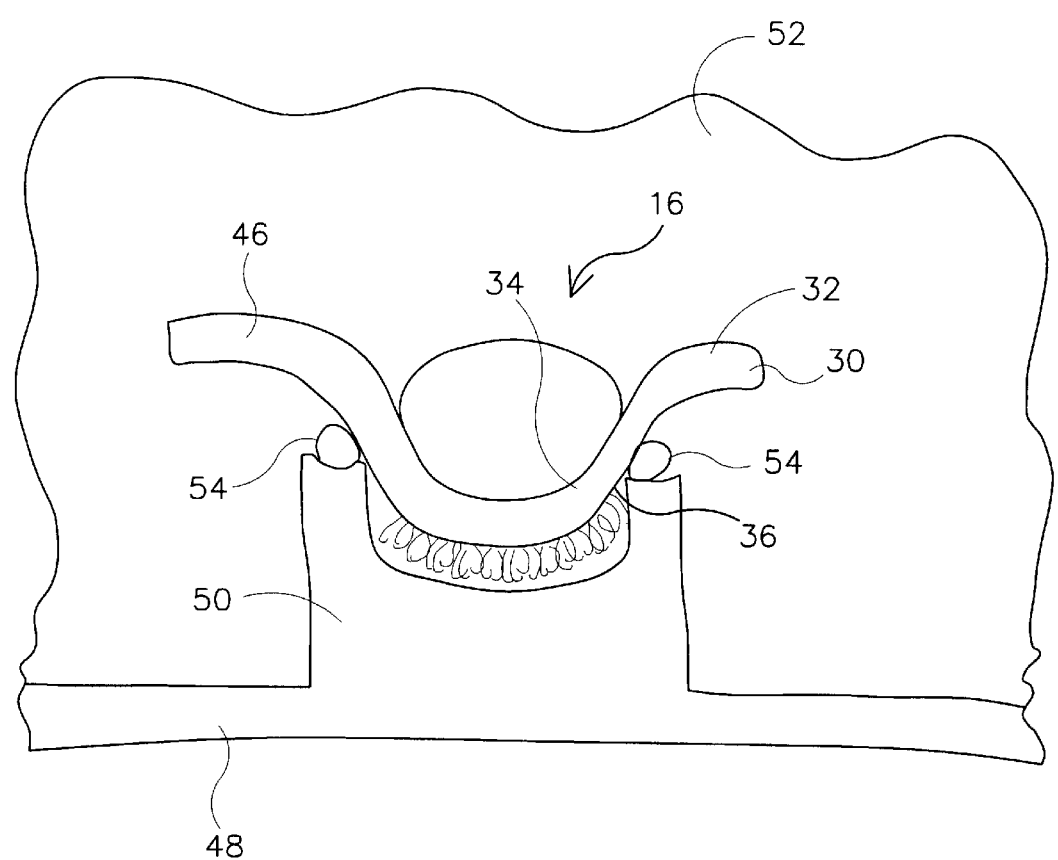
FIG. 4 is a partial cross-sectional view of a preferred mold used to fasten the foam pad to the fastening device of the preferred embodiment of the invention.

As shown in FIG. 4, the preferred method of foaming the foam pad against the fastening device 16 includes providing the fastening device 16, providing a mold 48 with a trench projection 50, and placing the fastening device 16 over and into the trench projection 50. The preferred method further includes pouring a foamable material 52 into the mold 48 and foaming the foamable material 52 against the fastening device 16. To prevent the migration of the foamable material 52 to the first surface 36 of the second section 34, the fastening device 16 preferably includes sealing members 54 coupled to the fastening member 30 on the first surface 36 of the second section 34, with one near the first section 32 and one near the third section 46. The sealing member 54 is preferably made from a foam material and is preferably foamed against the fastening member 30. The sealing member 54 may alternatively be made from other suitable devices and may be alternatively attached to the fastening member 30 with other suitable methods.

Figure 5:
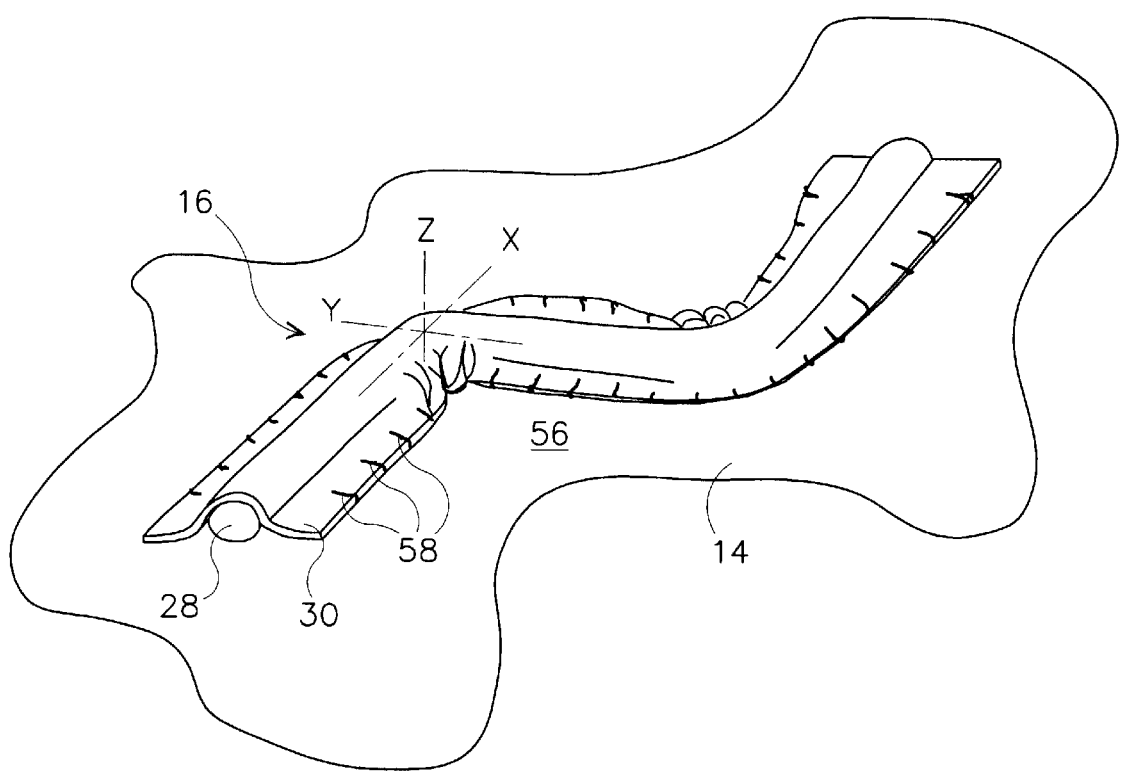
FIG. 5 is a perspective view of the fastening device of the preferred embodiment of the invention, placed along the surface of the foam pad.

As shown in FIG. 5, the supporting member 28 supports the otherwise flat fastening member 30 in an arcuate shape. This feature allows the fastening device 16 to extend in the 'x' dimension, contour along a surface 56 of the foam pad 14 in the 'z' dimension, and bend along the surface 56 in the 'y' dimension. In this manner, the fastening device 16 may be bent along the surface 56 of the foam pad 14 in a rectangular pattern, or any other suitable pattern. This feature allows the fastening device 16 to replace multiple unbendable fastening devices of the current techniques in the art, which reduces the number of parts needed to fasten the trim cover to the foam pad 14. The fastening device 16 of the preferred embodiment of the invention also includes a plurality of slits 58, which function to facilitate bending of the fastening member 30.

Figure 6:
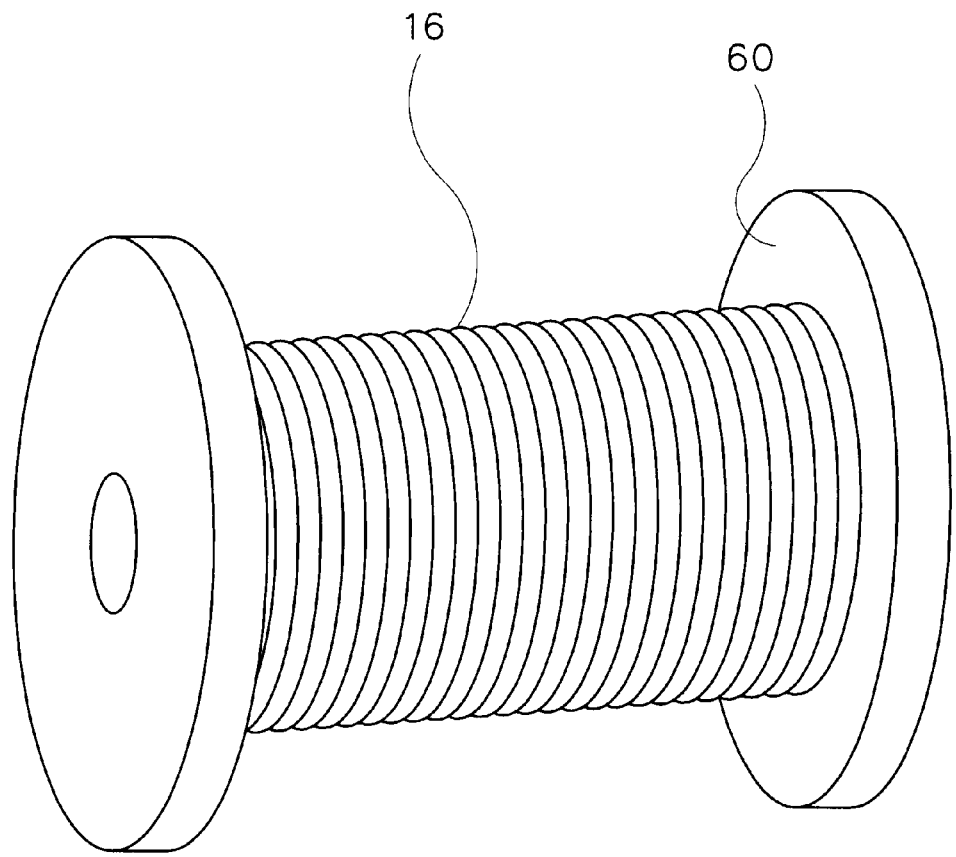
FIG. 6 is a perspective view of the fastening device wrapped around a spool.

As shown in FIG. 6, the fastening device 16 is preferably provided to the manufacturer of the vehicle seat assembly wrapped about a spool 60. Once delivered to the facility of the manufacturer, the fastening device 16 is preferably cut into proper lengths from the spool 60. This method increases the ability of the fastening device 16 to fit in other vehicle seat assemblies.

DETAILED DESCRIPTION OF THE PREFERRED METHOD

The following description of the preferred method is merely exemplary in nature, and is in no way intended to limit the invention or its application or uses. While the method of the invention is discussed in reference to a vehicle seat assembly, the method may be used to fasten other devices, such as a trim cover to a vehicle panel.

The preferred method for providing the vehicle seat assembly of the invention includes: providing the trim cover, providing the foam pad, providing the supporting member having an elongated shape and being flexible about a longitudinal axis, providing the fastening member including the first section and the second section having the first surface and the second surface opposite the first surface, fastening the second surface of the supporting member, bending the supporting member along the surface of the foam pad, fastening the first section of the fastening member to the foam pad, and engaging the first surface of the fastening member with a corresponding fastening member coupled to the trim cover.

The preferred method of the invention further includes providing the supporting member having a circular cross-section and providing the supporting member being a foam material, providing the fastening member with the third section and fastening member to the foam pad, providing the sealing member being a foam material and coupling the sealing member to the fastening member on the first surface of the second section near the first section, and providing the fastening member with the plurality of slits to facilitate bending of the fastening member along the surface of the foam pad.

The foregoing discussion discloses and describes a preferred embodiment of the invention and the preferred method of the invention. One skilled in the art will readily recognize from such discussion, and from the accompanying drawings and claims, that changes and modifications can be made to the invention without departing from the true spirit and fair scope of the invention as defined in the following claims.

I claim:
1. A vehicle seat assembly comprising:
   a trim cover;
   a foam pad having a trench therein;
   a supporting member positioned within the trench and having an elongated shape and being contourable and bendable along the trench of the foam pad; and
   a fastening member having an elongated shape and positioned within the trench including a first section fastened to said foam pad and a second section having a first surface engaged with a corresponding fastening member coupled to said trim cover and having a second surface opposite said first surface fastened to said supporting member.
2. The vehicle seat assembly of claim 1 wherein said supporting member has a circular cross-section.
3. The vehicle seat assembly of claim 1 wherein said supporting member is a foam material.
4. The vehicle seat assembly of claim 1 wherein said fastening member further includes a third section fastened to said foam pad.
5. The vehicle seat assembly of claim 4 wherein said second section is located between said first section and said third section, and wherein said first section and said third section extend away from said supporting member in opposite directions.
6. The vehicle seat assembly of claim 1 further comprising a sealing member coupled to said fastening member on said first surface of said second section near said first section, and being engageable with a mold to prevent the migration of a foamable material to said first surface of said second section.

7. The vehicle seat assembly of claim 6 wherein said sealing member is a foam material.

8. The vehicle seat assembly of claim 1 wherein said first section of said fastening member includes a plurality of slits to facilitate bending of said fastening member along the surface of said foam pad.

9. The vehicle seat assembly of claim 1 wherein said trim cover defines a trench, and wherein said first section of said fastening member is fastened within said trench to said foam pad.

10. The vehicle seat assembly of claim 1 wherein said foam pad is foamed against said fastening member.

11. A fastening device for fastening a trim cover to a foam pad, said fastening device comprising:
 a foam supporting member having an elongated shape and being contourable and bendable along a surface of the foam pad; and
 a fastening member including a first section fastenable to the foam pad and a second section having a first surface continuously engageable with a corresponding fastening member coupled to the trim cover and having a second surface opposite said first surface fastened to said supporting member.

12. The fastening device of claim 11 wherein said supporting member has a circular cross-section.

13. The fastening device of claim 11 wherein said fastening member further includes a third section fastenable to the foam pad.

14. The fastening device of claim 13 wherein said second section is located between said first section and said third section, and wherein said first section and said third section extend away from said supporting member in opposite directions.

15. The fastening device of claim 11 further comprising a sealing member coupled to said fastening member on said first surface of said second section near said first section, and being engageable with a mold to prevent the migration of a foamable material to said first surface of said second section.

16. The fastening device of claim 15 wherein said sealing member is a foam material.

17. The fastening device of claim 11 wherein said first section of said fastening member includes a plurality of slits to facilitate bending of said fastening member along the surface of the foam pad.

18. The fastening device of claim 11 wherein said first section of said fastening member is fastenable within a trench of the foam pad.

19. The fastening device of claim 11 wherein said first surface of said fastening member includes a first layer of a hook-and-loop material.

20. A method for providing a vehicle seat assembly comprising:
 providing a trim cover;
 providing a foam pad;
 providing a supporting member having an elongated shape;
 providing a fastening member including a first section and a second section having a first surface and a second surface opposite the first surface;
 fastening the second surface of the fastening member to the supporting member;
 contouring and bending the supporting member along a surface of the foam pad;
 fastening the first section of the fastening member to the foam pad; and
 engaging the first surface of the fastening member with a corresponding fastening member coupled to the trim cover in a substantially continuous manner along the lengths of the fastening members.

21. The method of claim 20 wherein said providing a supporting member includes providing a supporting member having a circular cross-section.

22. The method of claim 20 wherein said providing a supporting member includes providing a supporting member being a foam material.

23. The method of claim 20 wherein said providing a fastening member includes providing a fastening member further including a third section.

24. The method of claim 23 further comprising fastening the third section of the fastening member to the foam pad.

25. The method of claim 20 further comprising providing a sealing member; and coupling the sealing member to the fastening member on the first surface of the second section near the first section.

26. The method of claim 25 wherein said providing a sealing member includes providing a sealing member being a foam material.

27. The method of claim 20 wherein said providing a fastening member includes providing a fastening member including a first section including a plurality of slits to facilitate bending of the fastening member along the surface of the foam pad.

28. The method of claim 20 wherein said providing a foam pad includes providing a foam pad includes a trench; and wherein said fastening the first section of the fastening member to the foam pad includes fastening the first section of the fastening member within the trench of the foam pad.

29. The method of claim 20 further comprising wrapping the fastening member fastened to the supporting member about a spool.

30. The method of claim 29 further comprising cutting the fastening member fastened to the supporting member into proper lengths from the spool.

* * * * *